US008864074B2

(12) United States Patent
Flood

(10) Patent No.: US 8,864,074 B2
(45) Date of Patent: Oct. 21, 2014

(54) COMPOSITE PANEL STIFFENER

(75) Inventor: John Flood, Bristol (GB)

(73) Assignee: Airbus Operations Limited, Bristol (GB)

( * ) Notice: Subject to any disclaimer, the term of this patent is extended or adjusted under 35 U.S.C. 154(b) by 1279 days.

(21) Appl. No.: 12/602,158

(22) PCT Filed: Jun. 24, 2008

(86) PCT No.: PCT/GB2008/050480
§ 371 (c)(1),
(2), (4) Date: Nov. 30, 2009

(87) PCT Pub. No.: WO2009/004362
PCT Pub. Date: Jan. 8, 2009

(65) Prior Publication Data
US 2010/0170985 A1    Jul. 8, 2010

(30) Foreign Application Priority Data

Jun. 29, 2007  (GB) .................................. 0712553.7

(51) Int. Cl.
*B64C 3/18*    (2006.01)
*B64C 1/06*    (2006.01)
*B64C 3/26*    (2006.01)
*B29C 70/30*   (2006.01)
*G05B 19/4099* (2006.01)

(52) U.S. Cl.
CPC ............... *B64C 3/182* (2013.01); *Y02T 50/433* (2013.01); *B64C 3/26* (2013.01); *G05B 2219/35044* (2013.01); *B29C 70/30* (2013.01); *Y02T 50/43* (2013.01); *G05B 2219/45204* (2013.01); *G05B 19/4099* (2013.01)
USPC ....................... 244/123.1; 244/119; 244/123.8

(58) Field of Classification Search
USPC ......... 244/123.1, 123.12, 123.14, 123.8, 124, 244/119, 120
See application file for complete search history.

(56) References Cited

U.S. PATENT DOCUMENTS 2,403,569 A * 7/1946 Watter .......................... 244/124
2,471,490 A   5/1949 Mercer
(Continued)

FOREIGN PATENT DOCUMENTS

DE    1452724     3/1969
DE    1452724 A1  5/1969
(Continued)

OTHER PUBLICATIONS

Russian OA—Decision on Granting with English translation dated Jun. 18, 2013.
(Continued)

*Primary Examiner* — Tien Dinh
*Assistant Examiner* — Steven Hawk
(74) *Attorney, Agent, or Firm* — Lowe Hauptman & Ham, LLP

(57) ABSTRACT

A multi layer composite L-shaped stringer for use in an aerospace structure comprises a foot and a web extending from an edge of the foot. A first surface on the foot is shaped to abut a structure to be stiffened. The foot also has a second surface opposite the first surface. The web has a third surface and a fourth surface at the same layer in the composite material as the first and third surfaces, respectively. The geometry of the stringer may vary along its length (L) so that as the first surface is displaced towards the second surface, the fourth surface is displaced towards the third surface. The developed width (DW) from the distal edge of the foot to the distal edge of the web of the stringer may be substantially constant for all cross-sections along a length of the stringer. The risk of causing, during fabrication of the stringer, undesirable creasing, stressing or stretching of composite material layers in a region in which the geometry of the stringer varies may be reduced by means of such arrangements.

13 Claims, 12 Drawing Sheets

(56) References Cited

U.S. PATENT DOCUMENTS

| | | | |
|---|---|---|---|
| 2,655,194 A | 10/1953 | Nilsson | |
| 3,355,922 A | 12/1967 | Utashiro et al. | |
| 3,519,228 A * | 7/1970 | Windecker | 244/123.5 |
| 3,657,911 A | 4/1972 | Clarke et al. | |
| 3,838,590 A | 10/1974 | Van Dijk | |
| 4,006,617 A * | 2/1977 | Foster | 72/10.1 |
| 4,084,029 A * | 4/1978 | Johnson et al. | 428/119 |
| 4,331,723 A * | 5/1982 | Hamm | 428/61 |
| 4,913,910 A | 4/1990 | McCarville et al. | |
| 5,026,447 A * | 6/1991 | O'Connor | 156/166 |
| 5,036,688 A | 8/1991 | Gillean | |
| 5,074,139 A | 12/1991 | Elliott | |
| 5,096,525 A | 3/1992 | Engwall | |
| 5,171,510 A | 12/1992 | Barquet et al. | |
| 5,182,060 A | 1/1993 | Berecz | |
| 5,476,704 A * | 12/1995 | Kohler | 428/119 |
| 5,538,589 A | 7/1996 | Jensen et al. | |
| 5,729,462 A | 3/1998 | Newkirk et al. | |
| 5,820,804 A | 10/1998 | Elmaleh | |
| 5,848,765 A * | 12/1998 | Gillespie | 244/124 |
| 5,984,511 A * | 11/1999 | Vasey-Glandon et al. | 703/6 |
| 6,114,012 A * | 9/2000 | Amaoka et al. | 428/182 |
| 6,355,133 B1* | 3/2002 | Williams | 156/296 |
| 6,375,120 B1* | 4/2002 | Wolnek | 244/123.8 |
| 6,478,922 B1* | 11/2002 | Rosevear et al. | 156/297 |
| 6,513,757 B1* | 2/2003 | Amaoka et al. | 244/123.7 |
| 6,569,371 B1 | 5/2003 | Asari et al. | |
| 6,701,990 B1 | 3/2004 | Burley et al. | |
| 6,783,718 B2 | 8/2004 | Blanchon et al. | |
| 6,814,916 B2 | 11/2004 | Willden et al. | |
| 6,890,470 B2 | 5/2005 | Staub et al. | |
| 7,141,199 B2 | 11/2006 | Sana et al. | |
| 7,195,203 B2 | 3/2007 | Livingstone et al. | |
| 7,469,735 B2 | 12/2008 | Brown et al. | |
| 7,682,682 B2* | 3/2010 | Leon-Dufour et al. | 428/119 |
| 8,104,714 B2* | 1/2012 | Brown et al. | 244/123.8 |
| 8,276,848 B2* | 10/2012 | Zuniga Sagredo | 244/123.8 |
| 2005/0116105 A1* | 6/2005 | Munk et al. | 244/123 |
| 2007/0175573 A1 | 8/2007 | Fox et al. | |
| 2011/0095130 A1* | 4/2011 | Luettig | 244/119 |

FOREIGN PATENT DOCUMENTS

| | | |
|---|---|---|
| EP | 0395224 A2 | 10/1990 |
| EP | 1070661 A2 | 1/2001 |
| EP | 1134070 | 9/2001 |
| EP | 1134070 A1 | 9/2001 |
| EP | 1408224 | 4/2004 |
| EP | 1547756 A1 | 6/2005 |
| EP | 1555204 A1 | 7/2005 |
| EP | 1566334 | 8/2005 |
| GB | 2312532 A | 10/1997 |
| JP | 59027722 | 2/1984 |
| JP | 59179228 | 10/1984 |
| JP | 61108404 A | 5/1986 |
| JP | 62207637 A | 9/1987 |
| JP | 04299110 A | 10/1992 |
| JP | 05042590 A | 2/1993 |
| JP | 6226356 | 8/1994 |
| JP | 7089353 | 4/1995 |
| JP | 08025386 A | 1/1996 |
| JP | 08085159 A | 4/1996 |
| JP | 10137853 A | 5/1998 |
| JP | 2003053851 A | 2/2003 |
| JP | 2004351882 A | 12/2004 |
| RU | 2144487 C1 | 1/2000 |
| RU | 2219058 C1 | 12/2003 |
| SU | 1304743 A3 | 4/1987 |
| WO | 0024563 | 5/2000 |
| WO | 0037244 | 6/2000 |
| WO | 0196094 A2 | 12/2001 |
| WO | 0222440 A1 | 3/2002 |
| WO | 03082670 A1 | 10/2003 |
| WO | 2005/105413 A2 | 11/2005 |
| WO | 2005105413 | 11/2005 |
| WO | 2005105413 A2 | 11/2005 |
| WO | 2009004362 | 1/2009 |
| WO | 2009004364 | 1/2009 |

OTHER PUBLICATIONS

UK Search Report for GB0712553.7 dated Sep. 15, 2007.
ISR and WO for PCT/GB2008/050480 dated Apr. 22, 2009.
UK Search Report for GB0712552.9 dated Sep. 15, 2007.
ISR and WO for PCT/GB2008/050481 dated Mar. 30, 2009.
UK Search Report for GB0712549.5 dated Sep. 15, 2007.
ISR and WO for PCT/GB2008/050485 dated Mar. 31, 2009.

* cited by examiner

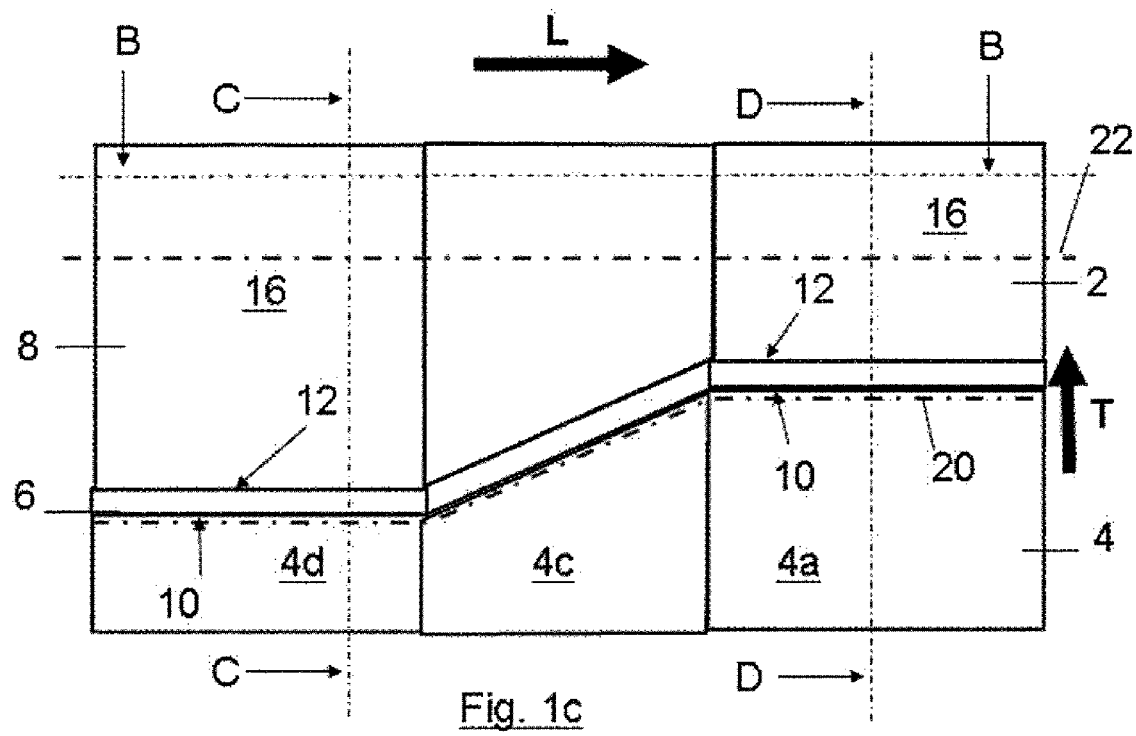
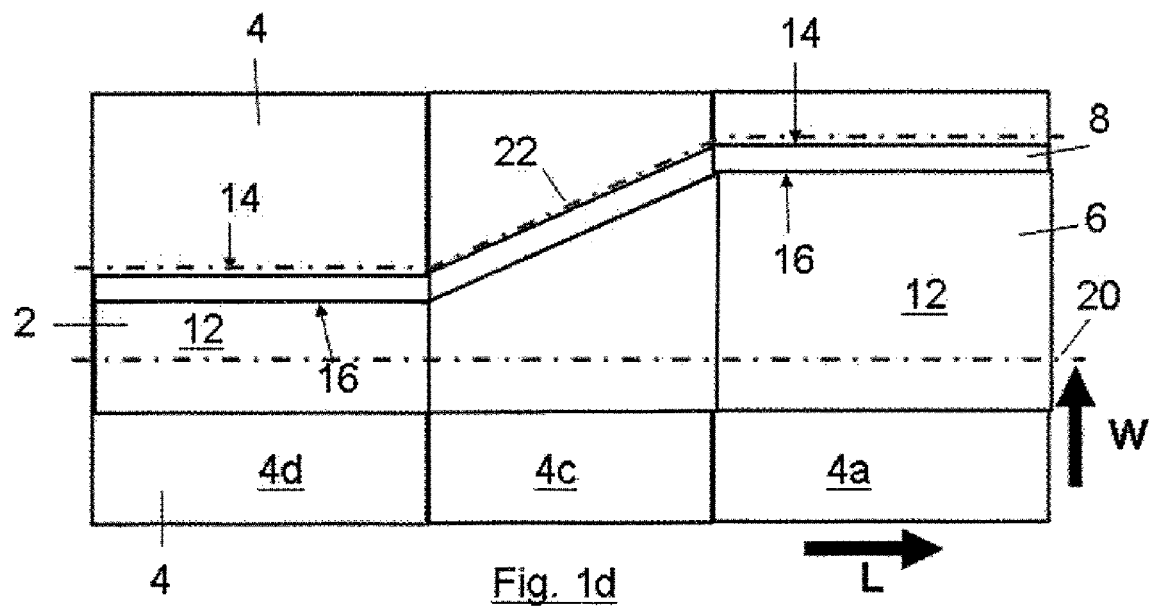

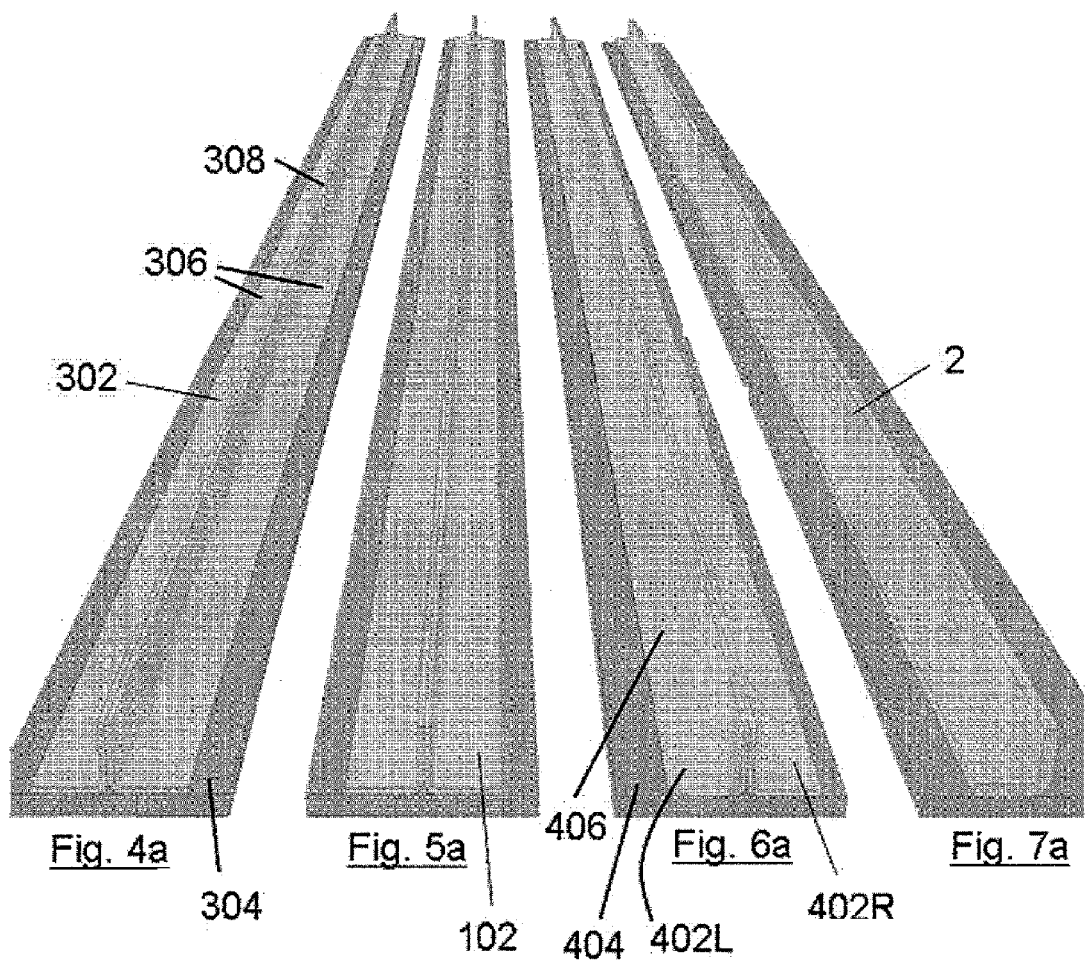

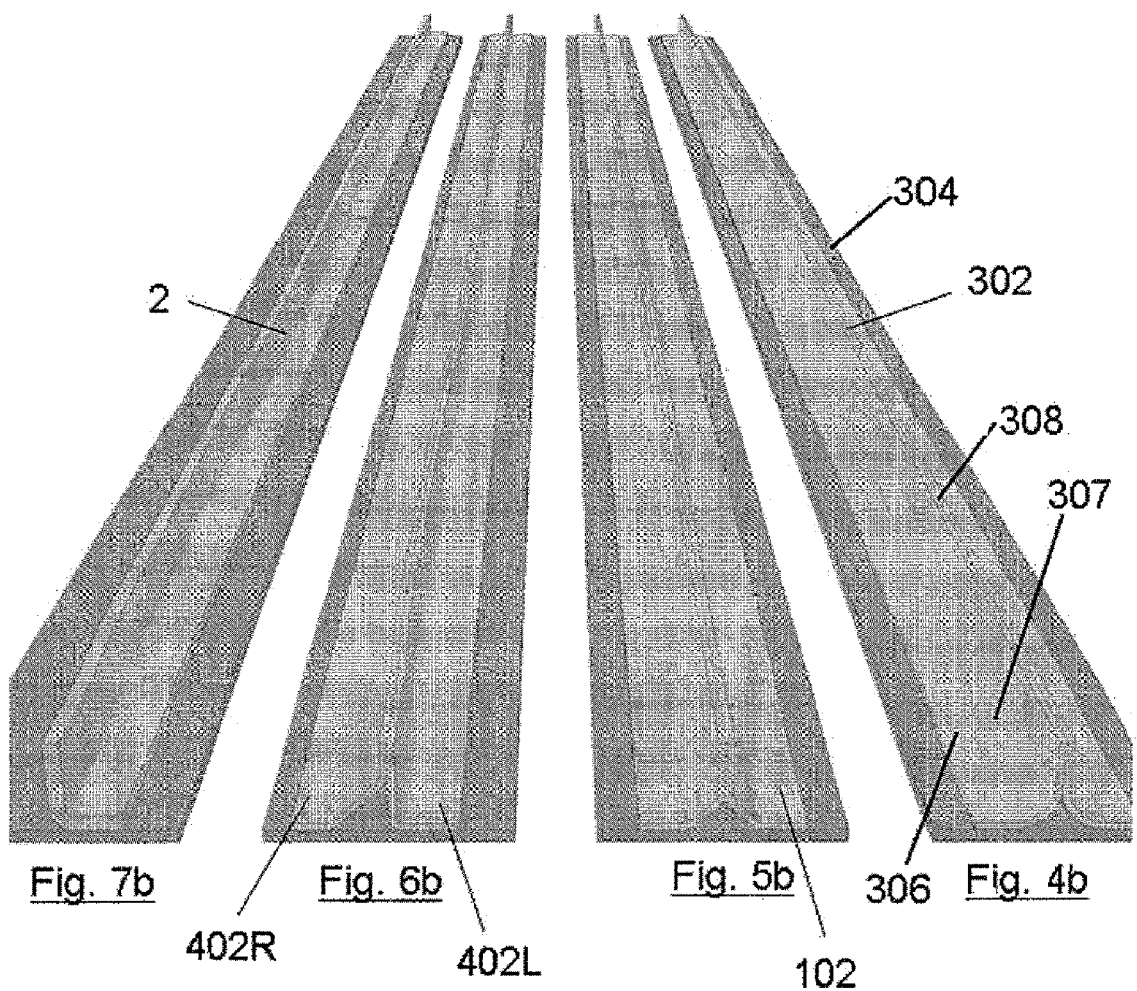

COMPOSITE PANEL STIFFENER

RELATED APPLICATIONS

The present application is a National Phase of PCT/GB2008/050480 filed Jun. 24, 2008, and claims priority from British Application Number 0712553.7 filed Jun. 29, 2007, the disclosures of which are hereby incorporated by reference herein in their entirety.

This application is related to concurrently filed applications titled ELONGATE COMPOSITE STRUCTURAL MEMBERS AND IMPROVEMENTS THEREIN (National Phase of PCT/GB08/050481) and IMPROVEMENTS IN ELONGATE COMPOSITE STRUCTURAL MEMBERS (National Phase of PCT/GB08/050485). The related applications are incorporated by reference herein in their entirety.

TECHNICAL FIELD

The present invention concerns composite, material structures for use in aerospace applications. More particularly, but not exclusively, this invention concerns a composite panel stiffener in the form of a composite stringer. The invention also concerns a method of designing and a method of manufacturing such a stringer, for example with the use of a suitably programmed computer.

BACKGROUND OF THE INVENTION

Stringers are used as stiffening members. Examples of the use of stringers include stiffening the skin or cover of an aerofoil box, fuselage section or similar structure. Stringers may have a cross-section in the form of a T-shape, in the form of an L-shape or other suitable shapes. Typically, the stringer will have a foot which has a shape adapted to abut the surface of the structure to be stiffened and a web that projects from the foot away from the surface of the structure, the web increasing the stiffness of the stringer. The web is sometimes referred to as the blade of the stringer.

The thickness or the geometry of the surface of the structure to be stiffened may vary thereby producing local features in the face of the structure adjacent to the stringer. Thus, corresponding variations in the geometry of the stringer may be necessary. Local variations in the geometry of the stringer can however introduce manufacturing problems when fabricating composite stringers. For example, in order to increase the local strength or stiffness of an aircraft wing panel it is common practice to vary the thickness of the panel locally where extra stiffness or strength is required. This results in pad-ups in the panel profile in the stringer-facing surface. Thus, the thickness of the panel may, with increasing direction along the length of the associated stringer, ramp up to a locally thicker section and then ramp down to a thinner section. To accommodate the change in thickness in the panel, the foot of the associated stringer needs to correspondingly ramp up and ramp down. The shape of the stringer may therefore include local variations in its cross-sectional geometry, as a function of distance along its length.

The desired shape of stringer for use when stiffening a panel may therefore be complicated and may deviate from a linearly symmetrical geometry. Manufacturing composite stringers having a complicated geometry can be difficult. If local changes in cross-sectional geometry of the stringer are required, defects may be introduced during the manufacturing process. Such defects usually result from layers of fibre material being compressed or folded in regions where there is too much material in view of the local geometry. This can produce creases in the final product, typically in the form of transverse creases. Defects can also result from layers of fibre material being stretched and/or stressed in regions where there is too little material in view of the local geometry. This too can produce creases in the final product, typically in the form of longitudinal creases. Either of the foregoing types of defect (too little material or too much material) can result in undesirable weakening of, and/or localised internal stresses in, the composite material in such regions. Such defects are typically allowed for and suitable margins built in by adding extra material in such regions, to counteract the strength-reducing defects. Whilst the strength of the resulting component may not be thus compromised, this technique introduces a weight penalty and excessive structural volume.

The present invention seeks to mitigate the above-mentioned problems. Alternatively or additionally, the present invention seeks to provide an improved shape of composite stringer and/or an improved method of designing and/or manufacturing the same.

SUMMARY OF THE INVENTION

The present invention provides according to a first aspect of the invention, a stringer for use in an aerospace structure, wherein the stringer is made from composite material comprising a multiplicity of layers, the stringer has a foot and a web extending from an edge of the foot so that the stringer has a generally L-shaped cross-section along its length, the stringer defines a first surface on the foot being shaped to abut a structure to be stiffened, a second surface on the foot being opposite the first surface, a third surface on or in the web being at the same layer in the composite material as the first surface, and a fourth surface on the web being on the same side of the stringer as the second surface, the geometry of the stringer varies along at least part of its length so that with increasing distance in a given direction along the length of the stringer the first surface is displaced towards the second surface as the fourth surface is displaced towards the third surface.

Thus, a stringer according to an embodiment of the first aspect of the invention for use on top of a lower wing panel may have a foot which joggles up (moves in the direction from the first surface to the second surface) whilst the web joggles out (moves in the direction from the fourth surface to the third surface). Matching the joggle on the foot with a corresponding joggle on the web allows the layers of the composite material that form the stringer to be laid up during manufacture of the stringer in a manner that reduces the risk of local creasing, local stressing and/or local stretching because changes in geometry in the foot (for example deviating from a simple linear geometry), which might otherwise result in defects, are offset by changes in geometry in the web.

The present invention also provides, in accordance with a second aspect of the invention, a stringer for use in an aerospace structure, wherein the stringer is made from composite material comprising a multiplicity of layers, the stringer has a foot and a web extending from the foot, the stringer defines a first surface on the foot being shaped to abut a structure to be stiffened, a second surface on the foot being opposite the first surface, a third surface on or in the web being at the same layer in the composite material as the first surface, and a fourth surface on the web being on the same side of the stringer as the second surface, the cross-sectional geometry of the stringer varies along at least part of its length so that the distance between the points at which a cross-section of the stringer intersects with first and second notional reference lines is substantially constant for all such cross-sections of the stringer along said at least part of the length, the distance being measured along the surface of the stringer at the cross-section, each cross-section being taken on a plane that has a normal parallel to the local lengthwise direction of the stringer, the first notional line being positioned on the first surface and being perpendicular to the direction in which the foot extends from the web, the second notional line being positioned on the third surface and being perpendicular to the direction in which the web extends from the foot.

Thus, a stringer according to an example of the second aspect of the invention for use on top of a lower wing panel, the stringer extending in a spanwise direction (i.e. transverse to the chordwise direction) may have a geometry that has a constant developed transverse width (in the chordwise direction). The developed transverse width in the context of this example is the distance in the chordwise direction along the first and third surfaces from a point at a far end of the foot of the stringer to a point at the far end of the web of the stringer. Having such a constant developed width allows the layers of the composite material that form the stringer to be laid up during manufacture of the stringer in a manner that reduces the risk of local creasing or bunching of fibres in the composite material and/or local stretching.

Designing a stringer to have such a constant chord width can be effected by means of matching a joggle on the foot with a joggle on the web as described with reference to the first aspect of the invention. Alternatively, or additionally, designing a stringer to have a constant chord width can be effected by means of introducing a chamfer/curved portion between the web and the foot that changes in size as the foot joggles up and down along the length of the stringer. Such a technique is described below with reference to the drawings and is also described and claimed in the Applicant's copending UK patent application entitled "Improvements in Elongate Composite Structural Members" with reference XA2345, having the same filing date as the present application. The contents of that application are fully incorporated herein by reference. The claims of the present application may incorporate any of the features disclosed in that patent application. In particular, the claims of the present application may be amended to include features relating to the introduction of a feature such as a chamfer/curved portion between the web and the foot of a stringer that changes in size as the foot joggles up and down along the length of the stringer. The stringer of the present invention may also be defined with reference to features of the elongate structural member described or claimed in the above-mentioned related patent application.

The stringer of the present invention may form part of a structure on an aircraft. The stringer may for example be mounted on a panel of an aircraft.

The invention provides an aerospace structure (such as for example a fuselage, an aerofoil box, or a section thereof), an outer surface of which being defined by a skin, wherein the skin is stiffened from inside the structure by means of a plurality of stringers mounted On the skin, each of the plurality of stringers being a stringer according to any aspect of the invention described or claimed herein.

The invention also provides an aircraft, an outer surface of which being defined by a skin, wherein the skin is stiffened from inside the aircraft by means of a plurality of stringers mounted on the skin, each of the plurality of stringers being a stringer according to any aspect of the invention described or claimed herein.

The invention yet further provides a method of making a design model for a composite stringer, wherein the stringer is a stringer according to any aspect of the invention described or claimed herein. The method may comprise the steps of:

providing first data defining the desired geometry of the foot of the stringer model, the separation of the foot from a datum plane varying along the length of the stringer, generating second data defining the geometry of the web of the stringer model including generating local changes in the geometry of the web at regions where it is determined from the first data that the separation of the foot from the datum plane changes, and using said first data and said second data to output a stringer model including a foot and a web.

The first data may form at least part of a collection of data that defines a model of the structure to be stiffened by the stringer. The desired geometry of the foot of the stringer model may therefore be derived indirectly from such a collection of data.

In embodiments of the present invention, the local changes in the geometry of the web are advantageously generated to reduce the risk of defects being created in a stringer made from layered composite material according to the stringer model. For example, the geometry of the web may include changes to off-set or compensate for changes in the geometry of the foot. Alternatively, or additionally, the geometry of the web may be designed to reduce any change in distance as measured along the surface of the stringer model from a first datum line on the foot surface to a second datum line on the web surface. The first datum line may for example lie on a surface on the foot of the stringer model, the line being so shaped that at all positions along its length it is perpendicular to the direction in which the foot extends from the web of the stringer model. The second datum line may lie on a surface on the web, the surface being on the same side of the stringer as the surface of the foot on which the first datum line lies, the second datum line being so shaped that at all positions along its length it is perpendicular to the direction in which the web extends from the foot of the stringer model.

The design method is preferably performed electronically, for example with the use of a suitably programmed computer. Once the stringer model is generated a stringer may be manufactured in accordance with the model so generated. The design of the stringer model may be performed in one country, with electronic data representing the stringer model being exported to a different country for use in such a method of manufacture.

The present invention also provides a method of manufacturing a stringer, wherein the method comprises the steps of:

providing a mould tool having a profile dependent on a stringer model generated by means of a design method in accordance with any aspect of the invention described or claimed herein, laying up layers of composite material on the mould tool, and then curing the layers of composite material.

It will of course be appreciated that features described in relation to one aspect of the present invention may be incorporated into other aspects of the present invention. For example, the method of the invention may incorporate any of the features described with reference to the stringer of the invention and vice versa. Also, the stringer according to the first aspect of the invention may incorporate any of the features described with reference to the stringer according to the second aspect of the invention and vice versa.

BRIEF DESCRIPTION OF THE DRAWINGS

Embodiments of the present invention will now be described by way of example only with reference to the accompanying schematic drawings of which:

FIG. 1b shows in perspective a portion only of the stringer and wing panel of FIG. 1a;

FIG. 1c is a sectional view of the stringer and wing panel taken along the plane A-A as shown in FIG. 1b;

FIG. 1d is a sectional view of the stringer and wing panel taken along the line B-B as shown in FIG. 1c;

FIG. 1e is a sectional view of the stringer and wing panel taken along the plane C-C as shown in

FIG. 1c;

FIG. 2b shows in perspective a portion only of the stringer and wing panel of FIG. 2a;

FIGS. 4a and 4b show a stringer in accordance with a fourth embodiment;

FIGS. 5a and 5b show a stringer in accordance with the second embodiment;

FIGS. 6a and 6b show a stringer in accordance with a fifth embodiment;

FIGS. 7a and 7b show a stringer in accordance with the first embodiment of the invention.

DETAILED DESCRIPTION

Figure 1A:
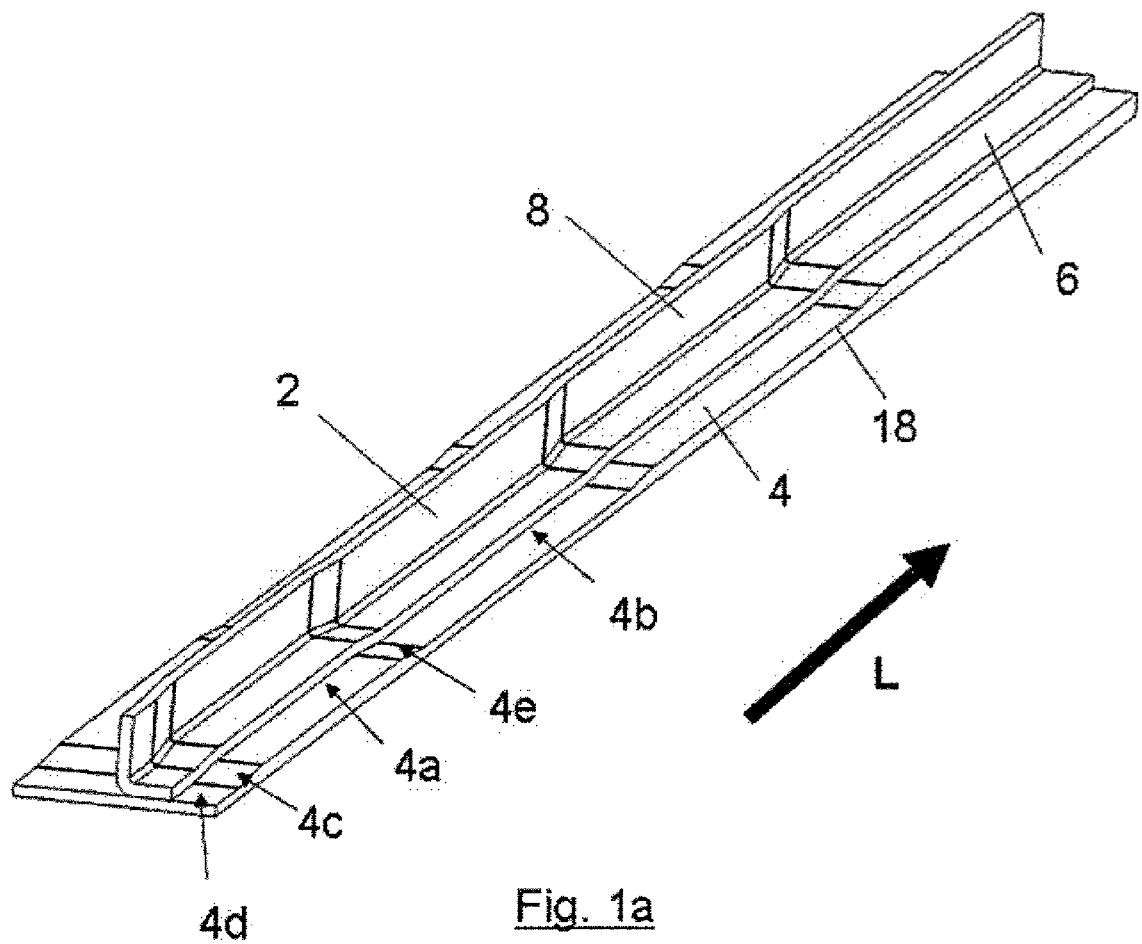
FIG. 1a shows in perspective view an L-shaped stringer, according to a first embodiment of the invention, mounted on a wing panel, only a portion of which being shown in the Figure.

FIG. 1a illustrates a stringer 2 mounted on a wing panel 4, only a part of the wing panel 4 being shown in FIG. 1a. The stringer 2 acts in use to stiffen the wing panel 4. The stringer 2 and wing panel 4 are both made from composite material, comprising multiple layers of material. The stringer 2 in this embodiment is generally L-shaped in cross-section, the L-shape being defined by a foot 6 which is mounted on, and lies parallel with, the wing panel 4 and a web 8 that extends perpendicularly from one edge of the foot 6. (It will be appreciated that the web could extend from the foot at other angles). The layers of composite material (not individually shown in the Figures) of the stringer 2 are also generally L-shaped in cross-section, following the cross-sectional profile of the stringer in bulk.

The stringer 2 thus has a first surface 10 on the underside of the foot which abuts the wing panel 4. Opposite the first surface 10, there is a second surface 12 on the foot 6. The first surface 10 on the foot meets a third surface 14 on the web, the first and third surfaces being on the same side of the stringer 2 and therefore also being at the same layer in the composite material structure as each other. There is a fourth surface 16 opposite the third surface 14. The fourth surface 16 is therefore on the web, on the same side of the stringer as the second surface 12 and also at the same layer in the composite material structure as the second surface 12.

As can be seen from the edge 18 of the wing panel 4 shown in FIG. 1a, the thickness of the wing panel 4 varies along the length L of the stringer. Thus, the wing panel 4 includes regions such as region 4a which are thicker than adjacent regions such as region 4b. As one moves along the length of stringer 2 in the direction indicated by arrow L, the thickness of the wing panel 4 ramps up, via a region 4c, from a thinner region 4d to a thicker region 4a and then ramps down, via a region 4e, to a thinner region 4b. The foot 6 of the stringer similarly ramps up and ramps down so that the first surface 10 of the stringer (the surface which abuts the wing panel 4) follows the upper surface (as shown in FIG. 1a) of the wing panel 4.

Figure 1B:
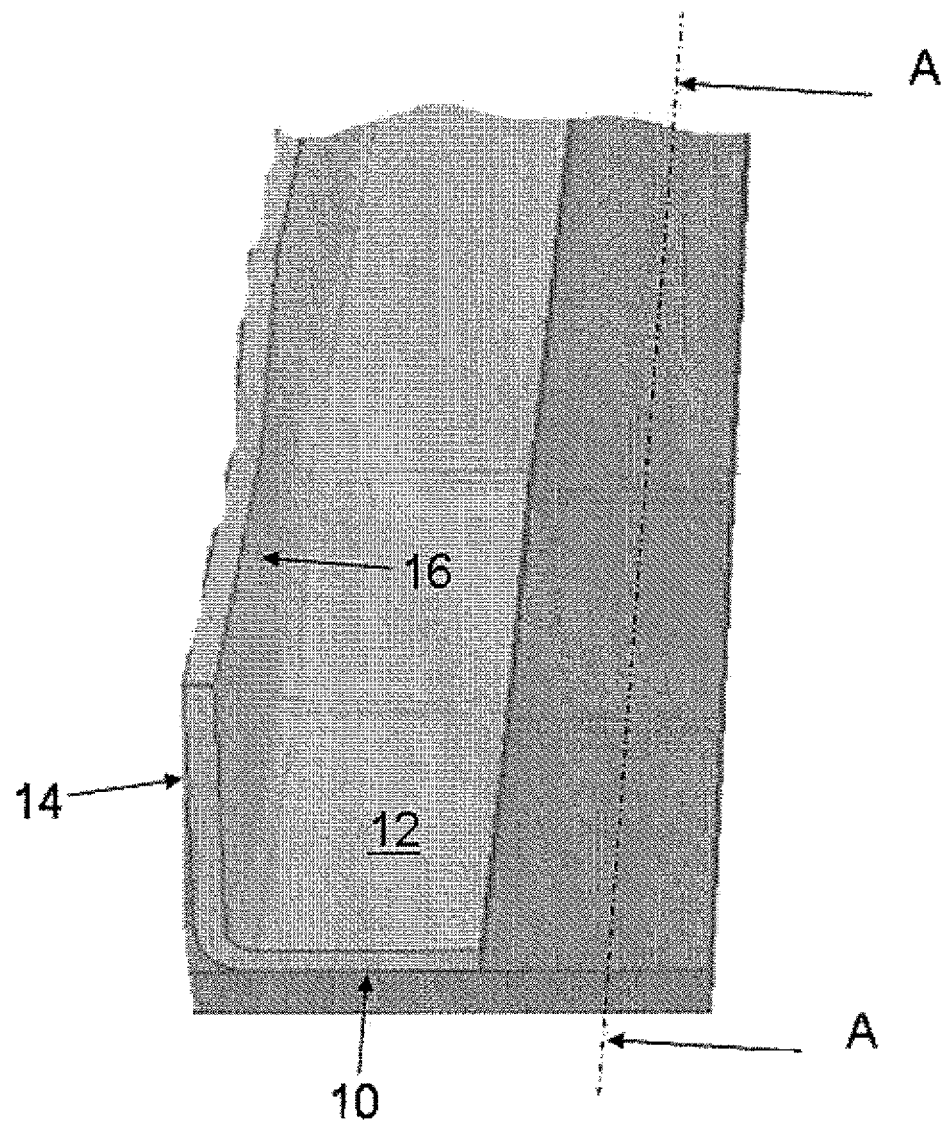

FIGS. 1b, 1c, and 1d show the parts of the stringer 2 and wing panel 4 that are in the area of regions 4d, 4a, and 4a mentioned above and illustrate how the shape of the stringer changes along its length between the transitions from the thinner region 4d of the wing panel 2a to the thicker region 4a of the panel, via the ramping region 4c. FIG. 1b is a perspective view of the stringer. FIG. 1c shows a cross-sectional view of the stringer 2 and wing panel 4 taken about the vertical plane represented by line A-A in FIG. 1b. FIG. 1d shows a cross-sectional view of the stringer 2 and wing panel 4 taken about the horizontal plane represented by line B-B in FIG. 1c. It will be seen in FIG. 1c that, in the area of the ramping transition represented by region 4c, with increasing distance along the length of the stringer (direction L), the first surface 10 moves in the direction represented in FIG. 1c by arrow T. The direction T is transverse to the length L of the stringer and is in the direction from the first surface 10 to the second surface 12 of the foot 6 of the stringer. It will be seen from FIG. 1d that, as the first surface 10 on the foot 6 moves in the direction T with increased length L along the stringer, the fourth surface 16 on the web 8 moves in the direction represented in FIG. 1d by arrow W. The direction W is also transverse to the length L of the stringer and is in the direction from the fourth surface 16 to the third surface 14 of the stringer 2. It will also be seen from FIGS. 1c and 1d that the thickness of the stringer in the region of the foot 6 and the web 8 remains substantially constant along the length of the stringer 2. Therefore, with increasing length L the second surface 12 also moves in the direction T and the third surface 14 also moves in the direction W, the second and third surfaces 12, 14 following the movement of the first and fourth surfaces 10, 16, respectively.

When moving further along the length L of the stringer 2, from the portion abutting the thicker region 4a of the wing panel 4 to the ramping down region 4e, the thickness of the wing panel reduces. As the thickness of the wing panel reduces with increased length L along the stringer 2, the first and second surfaces 10, 12 on the foot 6 move in a direction opposite to the direction T as the third and fourth surfaces 14, 16 move in a direction opposite to the direction W.

Figure 1E:
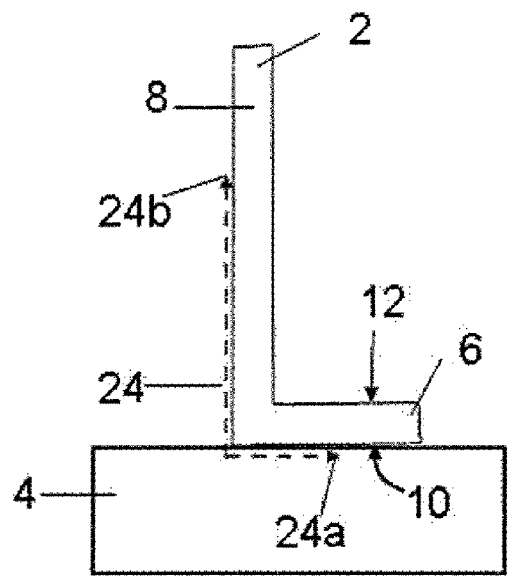
Figure 1F:
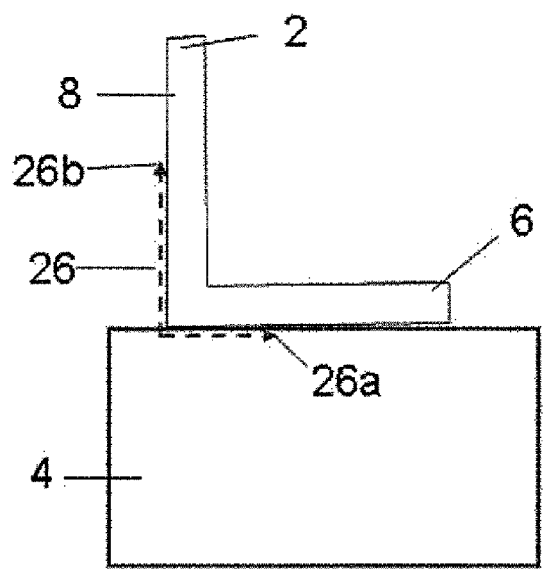
FIG. 1f is a sectional view of the stringer and wing panel taken along the plane D-D as shown in FIG. 1c.

FIGS. 1e and 1f show cross-sections of the stringer 2 and wing panel 4 taken along the vertical planes represented by lines C-C and D-D in FIG. 1c. FIGS. 1e and 1f illustrate that the developed width (the meaning of which being explained in further detail below) of the stringer as measured between two notional reference lines remains substantially constant along the length L of the stringer. Having such a constant developed width, despite changes in the cross-sectional geometry of the stringer 2, assists in reducing defects, for example creases, that might otherwise result when laying up the layers of the composite material that form the stringer 2. The dimensions represented by such a developed width will now be explained with reference to FIGS. 1c to 1f.

FIGS. 1c and 1d show a first notional reference line 20 and a second notional reference line 22, both lines generally following, but not always being exactly parallel to, the length L of the stringer. The first notional line 20 lies on the first surface 10 of the stringer 2 and is so shaped that at all positions along its length it is perpendicular to the direction in which the foot 6 extends from the web 8 (this direction, in this embodiment, being parallel to direction T as shown in FIG. 1c). In the case where the stringer 2 has a length L that lies along a generally straight axis, the first notional line 20 lies on a plane that is parallel to the length L of the stringer, the plane having a normal axis in the direction in which the foot extends from the web, this direction being parallel to direction W as shown in FIG. 1d. (It will be appreciated that in FIG. 1d, the first surface 10 is hidden from view, being behind the second surface 12.)

The second notional line 22 lies on the third surface 14, the line 22 being so shaped that at all positions along its length it is perpendicular to the direction in which the web 8 extends from the foot 6 (this direction, in this embodiment, being parallel to direction W as shown in FIG. 1d). In the case where the stringer 2 has a length L that lies along a generally straight axis, the second notional line 22 lies on a plane that is parallel to the length L of the stringer, the plane having a normal axis in the direction in which the web extends from the foot, this direction being parallel to direction T as shown in FIG. 1c. (It will be appreciated that in FIG. 1c, the third surface 14 is hidden from view, being behind the fourth surface 16.)

As will be apparent, from FIGS. 1c and 1d, that the first and second notional lines 20, 22, by following the first and third surfaces 10, 14, respectively, each include angled portions to accommodate the ramping across region 4c.

The cross-section illustrated by FIG. 1e shows the measurement of the developed width, that is, the distance between the first and second notional lines 20, 22 as measured along the surface of the stringer 2 at the cross-section. This measurement is represented by double-headed arrow 24 having a first end 24a, which coincides with the first notional line 20 (not shown in FIG. 1e) and having a second end 24b, which coincides with the second notional line 22 (not shown in FIG. 1e). Similarly, FIG. 1f showing the cross-section of the stringer at section D-D, includes a double-headed arrow 26 showing the measurement of the distance from the position 26a of the first notional line 20 (not shown in FIG. 1f) to the position 26b of the second notional line 22 (not shown in FIG. 1f) at the cross-section illustrated. The developed widths represented by the double-headed arrows 24, 26 in FIGS. 1e and 1f are substantially equal (that is, equal within allowable tolerances). In order to achieve this, the amount by which the first surface 10 moves in the direction T is offset by movement of the fourth surface 16 in the direction W. Thus, with reference to FIG. 1a, as the foot 6 of the stringer 2 joggles up moving from region 4d to region 4a via region 4c, the web 8 of the stringer 2 joggles out (to the left as shown in FIG. 1a).

Figure 1G:
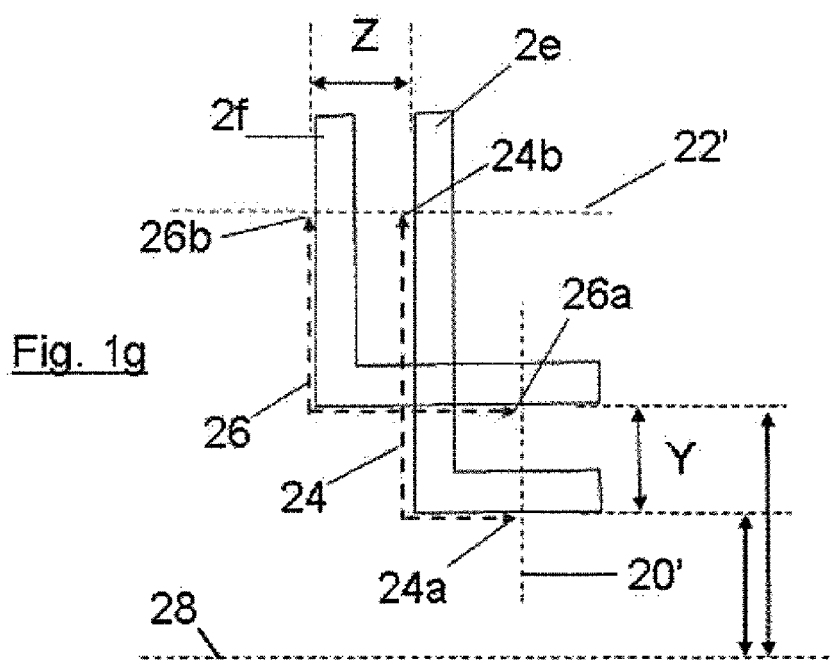
FIG. 1g is a composite view showing the cross-sections of the stringer as shown in FIGS. 1e and 1f overlaid one on the other to provide ready comparison of the relative dimensions and shapes of the cross-sections.

FIG. 1g shows the cross-section 2e of the stringer shown in FIG. 1e and the cross-section 2f of the stringer shown in FIG. 1f as a composite drawing. The horizontal position of the first notional line 20 on each cross-section is shown in FIG. 1g by means of the dashed line 20'. The vertical position of the second notional line 22 on each cross-section is indicated by the dashed line 22' in FIG. 1g. The distance represented by the double-headed arrow 24 for the stringer cross-section 2e at plane C-C (the section shown in FIG. 1e) is equal to the distance represented by the double-headed arrow 26 for the stringer cross-section 2f at plane D-D (the section shown in FIG. 1f). In this case, it will be seen that the horizontal offset Z between the positions of the web 8 of each stringer cross-sections is equal to the vertical offset Y and between the positions of the height of the foot above a notional datum plane 28.

Figure 2A:
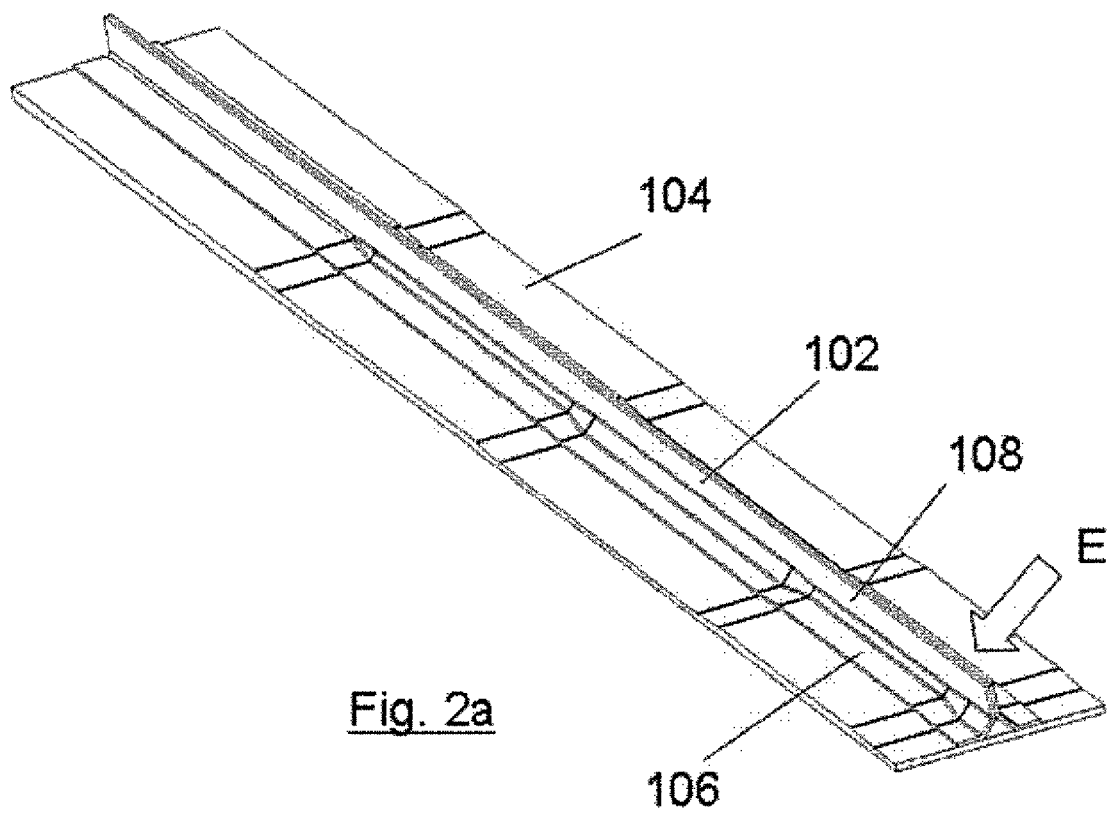
FIG. 2a shows in perspective view a Y-shaped stringer, according to a second embodiment of the invention, mounted on a wing panel, only a portion of which being shown in the Figure.
Figure 2B:
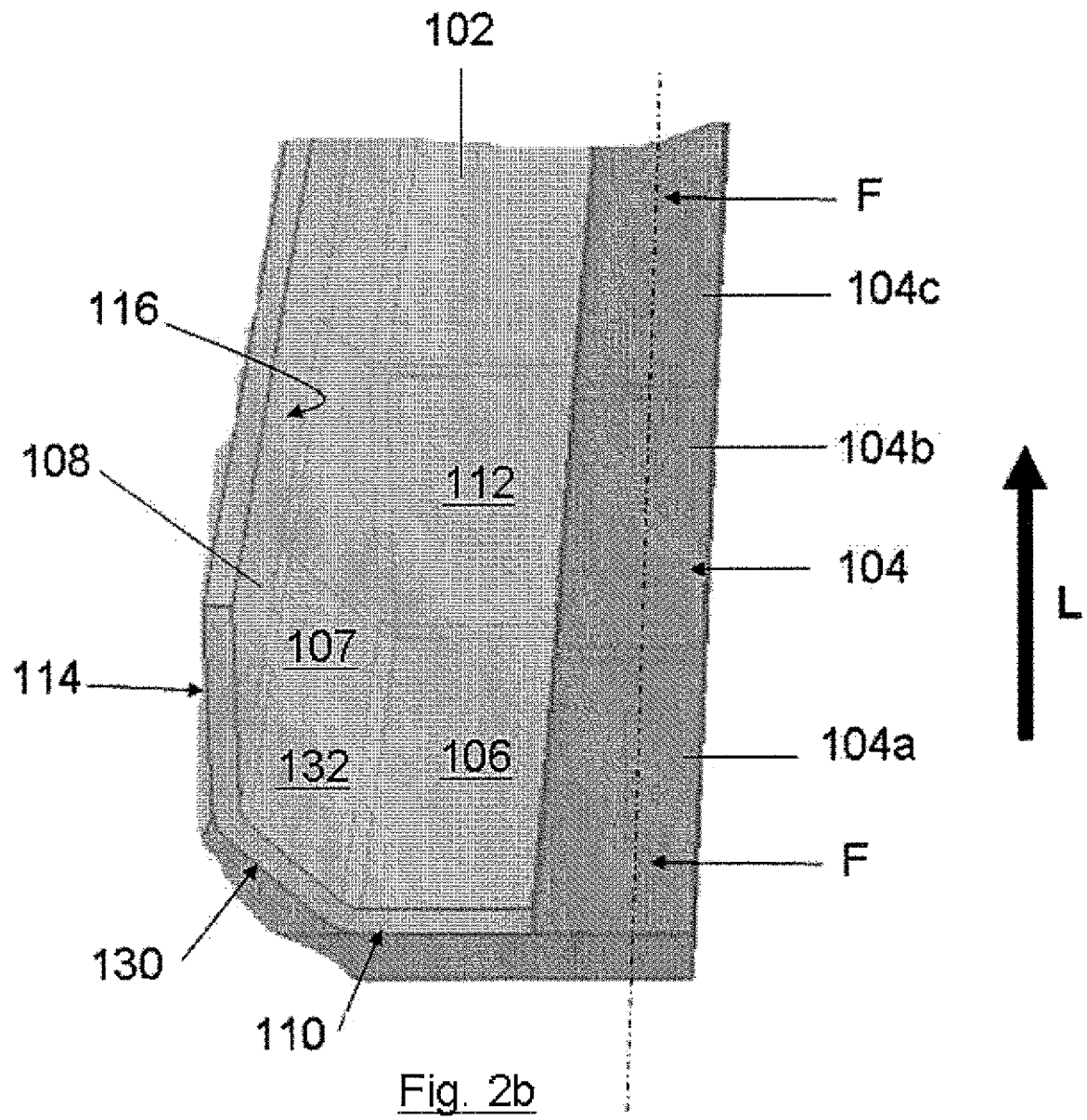

FIG. 2a shows in perspective a stringer 102 in accordance with a second embodiment of the invention. The stringer 102 has a generally Y-shaped cross-section. The Y-shape of the cross-section is inverted (in the orientation shown in FIG. 2a) so that parts of the arms of the Y-shape abut the wing panel 104, thereby defining the feet 106 of the stringer 102. The stalk of the Y-shape defines part of the web 108 (sometimes also referred to as the blade) of the stringer 102. FIG. 2b shows a portion of the stringer 102 and wing panel 104 in the region indicated by the arrow E in FIG. 2a. In a similar manner to the first embodiment, the wing panel 104 comprises successive regions, in the longitudinal direction L, of differing thicknesses. The panel thus has a thinner region (region 104a), which leads via a ramping-up region (region 104b) to a thicker region (region 104c).

In a similar manner to the first embodiment, the foot 106 of the stringer 102 of the second embodiment defines first, second, third and fourth surfaces 110, 112, 114, and 116. For each side (left and right as seen in FIG. 1), there being one foot 106 per side, the stringer 102 has a first surface 110 (on the exterior of the stringer) on the underside of the foot 106 which abuts the wing panel 104. Opposite the first surface 110, there is a second surface 112 (also on the exterior of the stringer) on the foot 106. The upper part of the web defines a third surface 114, within the interior of the web 108, the third surface being at the same layer in the composite material structure as the first surface 110. There is also a fourth surface 116 (on the exterior of the stringer) being at the same layer in the composite material structure as the second surface 112. The fourth surface 116 is therefore on the web and on the same side of the stringer as the second surface 112. The developed width for a given cross-section of the stringer from the point on the first surface 110 coincident with a first notional line to the point on the third surface 114 coincident with a second notional line (the first and second notional lines being similarly defined as above with reference to the first embodiment) is substantially constant for all transverse cross-sections of the stringer.

In this second embodiment, the developed width is kept constant not by means of joggling the web of the stringer left and right as the foot of the stringer joggles up and down, but by means of introducing a chamfer 107 between the foot 106 and web 108 of the stringer 102, the width of the chamfer 107 (as measured across the stringer) varying according to the height of the foot 106 from a notional datum plane 128. The chamfer 107 can clearly be seen in perspective in FIG. 2b.

The chamfer portion 107 that joins the foot 106 and the web 108 defines fifth and sixth surfaces 130, 132, the fifth surface 130 being interposed between and joining the first and third surfaces 110, 114 and the sixth surface 132 being interposed between and joining the second and fourth surfaces 112, 116. The chamfer 107 in this embodiment extends at an angle of about 45° from the foot 106 and at an angle of about 45° from the web 108, the web 108 being perpendicular to the foot 106. The angle between the foot and chamfer and between the chamfer and the web may of course be different in other embodiments of the invention. The fifth and sixth surfaces 130, 132 are therefore non-parallel with any of the first, second, third and fourth surfaces 110, 112, 114, 116. The chamfer portion 107 may be considered as forming part of the web 108.

Figure 2C:
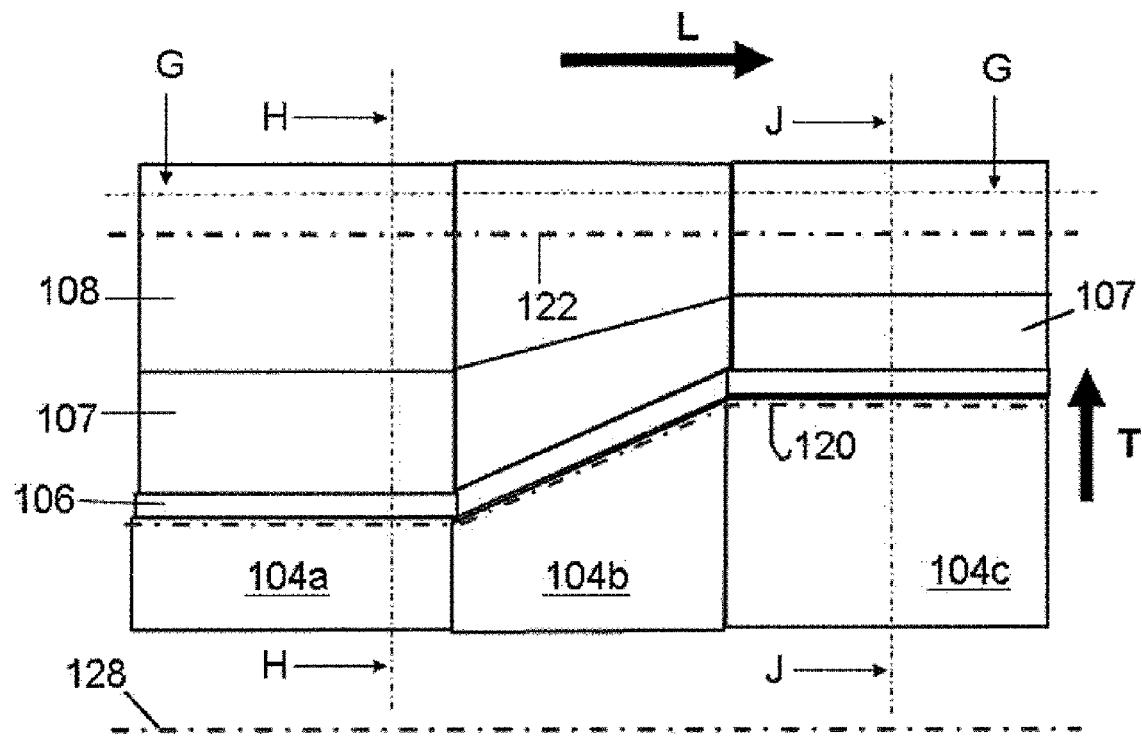
FIG. 2c is a sectional view of the stringer and wing panel taken along the plane F-F as shown in FIG. 2b
Figure 2D:
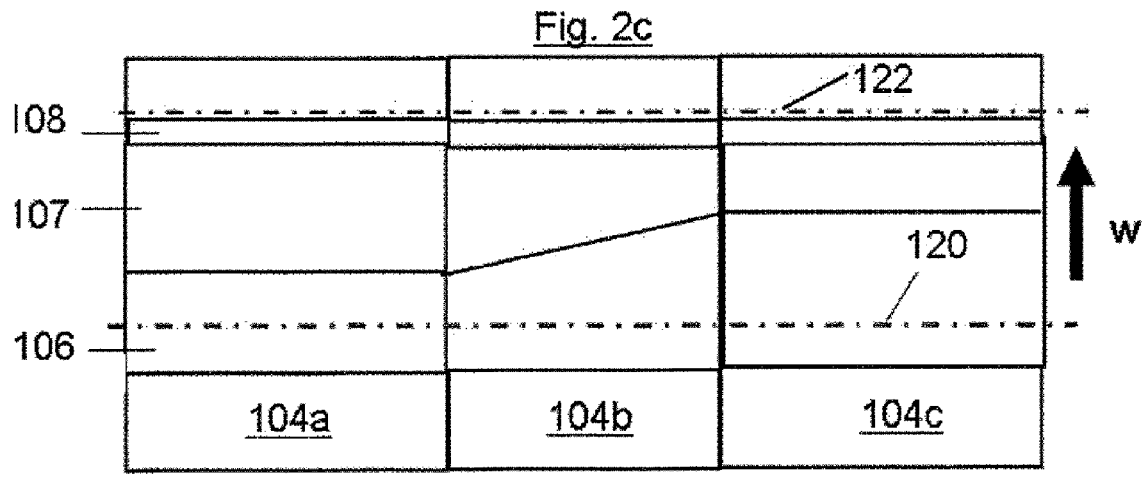
FIG. 2d is a sectional view of the stringer and wing panel taken along the line G-G shown in FIG. 2c.

FIGS. 2c and 2d show cross-sectional views of the stringer 102 along the planes F-F (shown in FIG. 2a) and G-G (shown in FIG. 2c), respectively. As can be seen by following the length of the stringer from left to right in FIGS. 2c and 2d (by following arrow L), the chamfer region 107 gets smaller as the height of the foot 106 of the stringer 102 above a notional datum plane 128 increases. Thus, the chamfer region 107 gets smaller as the foot 106 moves in the upwards direction (arrow T in FIG. 2c). FIGS. 2c and 2d also show the positions of the first and second notional lines 120, 122 between which the developed width of the cross-section of the stringer is measured.

Figure 2E:
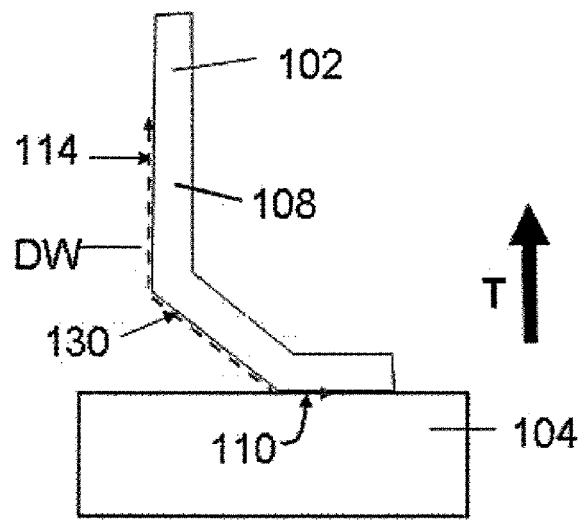
FIG. 2e is a sectional view of the stringer and wing panel taken along the plane H-H as shown in FIG. 2c.
Figure 2F:
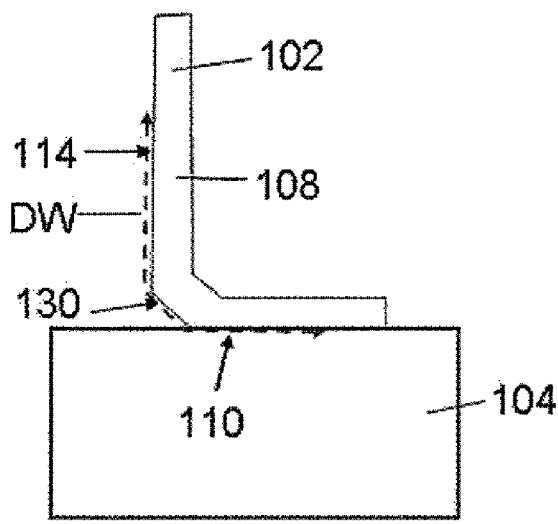
FIG. 2f is a sectional view of the stringer and wing panel taken along the plane J-J as shown in FIG. 2c.

FIGS. 2e and 2f show cross-sections taken about the planes represented by lines H-H and J-J in FIG. 2c. These cross-sections illustrate that the developed width DW between the first and second notional lines remains the same from one cross-section to the next. This is achieved by shortening the chamfered region 107 as the foot 106 of the stringer 102 moves upwards. It will be noted that, in contrast with the stringer of the first embodiment, the horizontal position (as shown in FIGS. 2e and 2f) of the web 108 of the stringer 102 does not change with increased length L of the stringer. Thus, as can been seen in FIG. 2a, the foot 106 and web 108 of one side of the stringer 102 may be symmetrical with the foot 106 and web 108 of the other side of the stringer, with the web 108 running along the centre line of the stringer with no joggles left or right.

Figure 2G:
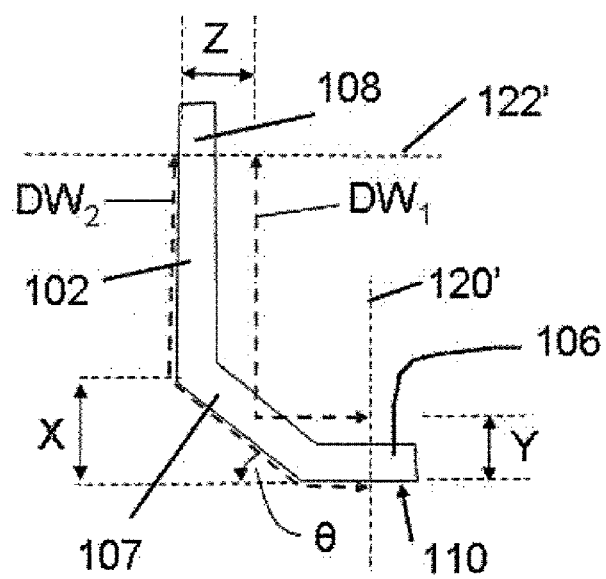
FIG. 2g shows the cross-section of the stringer shown in FIG. 2e, together with various indications of dimensions.

FIG. 2g shows how to calculate the width of chamfer required in order to maintain a constant developed width between the two notional lines at any given transverse cross-section. The developed width $DW_1$ for a stringer with no chamfer is shown next to the cross-section of a stringer 102 including a chamfer 107, the stringer having a developed width $DW_2$. It will be seen that the horizontal position of the first notional line is shown in FIG. 2g by means of the dashed line 120' and that the vertical position of the second notional line is shown by means of the dashed line 122'. The web 108 of the stringer 102 is offset from the unchamfered line $DW_1$ by a distance Z. The first surface 110 on the underside of the foot 106 is separated from the unchamfered line $DW_1$ by a vertical distance Y. The chamfer 107 extends from the foot 106 at an angle of θ and terminates at a vertical distance X above the first surface 110. Given desired offsets Y and Z, it is necessary to know at what distance the chamfer should start and stop and this can be calculated by means of the following formula (assuming that the web is perpendicular to the foot, which it is in this embodiment):

$$X = \frac{Y+Z}{1 + \frac{1}{\tan\theta} - \frac{1}{\sin\theta}}$$

When, as in this case θ=45°, then this formula simplifies to:

$$X = 1.707 \times (Y+Z)$$

In the present (second) embodiment, the horizontal offset Z is constant and can be set to zero so that the web 108 of the stringer 102 does not joggle left or right. The above formula therefore further simplifies to X=1.707Y. Similar formulae can of course be readily derived to account for different geometries including those where the foot does not extend from the web (when ignoring corner radii and fillets and other local features) at an angle of 90°.

Figure 3:
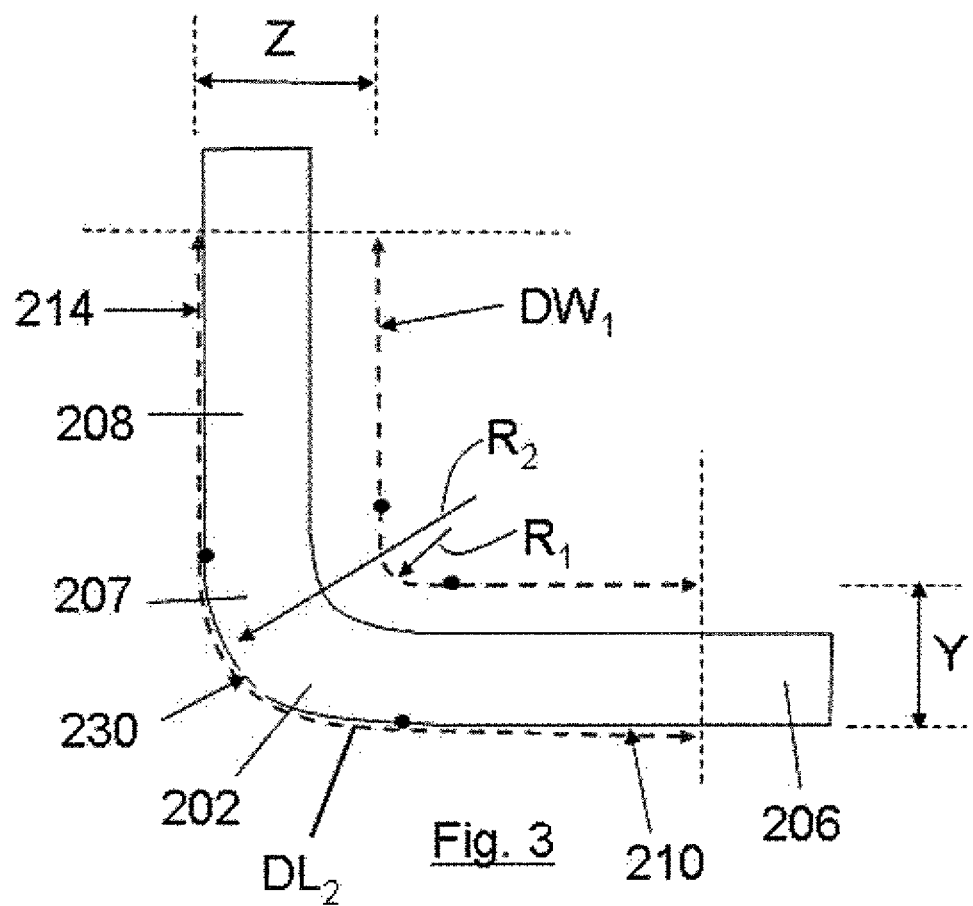
FIG. 3 shows a cross-section of a stringer in accordance with a third embodiment.

It will be appreciated that the developed width DW of the distance between the two notional lines may be maintained constant at any cross-section along the length of the stringer by means of introducing other geometrical features. For example, instead of providing a chamfer at the junction between the foot and the web of the stringer, a smooth transition may instead be provided, for example by means of a curved surface. FIG. 3 illustrates a third embodiment of the invention, which illustrates how such an alternative technique might be employed. Again, a notional developed width $DW_1$ is set, at a position at which the foot 206 of the stringer 202 is at its highest. The developed width $DW_1$ is again measured along the surface of the stringer at the cross-section and thus passes over first, third and fifth surfaces of the stringer (the first, third and fifth surfaces being the same surfaces on/in the stringer as described above with reference to the second embodiment). Thus, the first surface 210 is positioned on the underside of the foot 206, the third surface 214 is positioned in the web 208, and the fifth surface 230 joins the first and third surfaces. In this third embodiment, the fifth surface is defined by a smooth curve having a constant radius of curvature. The radius of curvature of the fifth surface corresponding to the notional developed width $DW_1$ is $R_1$. In order to maintain a constant developed width DW, the radius of curvature of the fifth surface may be changed to accommodate offsets in the vertical direction of the position of the foot 206 and/or to accommodate offsets in the horizontal direction of the position of the web 208, such offsets being illustrated in FIG. 3 by the distances Y and Z respectively. For given offsets Y and Z and for maintaining a constant developed width $DW=DW_1=DW_2$, the radius of curvature of the fifth surface 230 of the stringer 202, defined by radius $R_2$ must satisfy the following formula:

$$R_2 = R_1 + \frac{Y+Z}{2 - \pi/2}$$

FIGS. 4a and 4b illustrate a stringer 302 in accordance with a fourth embodiment of the present invention. FIG. 4a shows the stringer 302 from one direction and FIG. 4b shows the stringer from the opposite direction. The stringer 302 has a cross-section generally in the form of an inverted Y, the stringer 302 including feet portions 306 and a web portion 308. Each foot portion 306 is connected to the web portion 308 via a curved portion 307. The curved portion 307 has a radius of curvature and a width that varies along the length of the stringer 302 as the feet 306 of the stringer joggle up and down to accommodate changes in thickness of the wing panel 304. The web 308 of the stringer follows a substantially straight line when viewed from above and does not therefore include any transverse joggles. The radius of curvature of the curved portion 307 thus satisfies the formula:

$$R_2 = R_1 + \frac{Y}{2 - \pi/2},$$

where Y represents a measure of the vertical displacement of the foot of the stringer above a notional datum plane and $R_1$ is a preset constant.

FIGS. 5a and 5b show opposite ends of a stringer in accordance with the second embodiment and are included to aid comparison between the stringers illustrated by FIGS. 4a to 7b.

FIGS. 6a and 6b show a stringer 402 in accordance with a fifth embodiment, utilising concepts from both the first and second embodiments. Thus, with reference to FIG. 6a, the left-hand part 402L of the stringer is defined by an L-shape that has a web that joggles left and right as the foot 406 of the stringer 402 joggles up and down to accommodate changes in thickness in the wing panel 404. The left-hand part 402L of the stringer is thus similar to the L-shaped stringer of the first embodiment of the present invention. The right-hand part 402R of the stringer (on the right as shown is FIG. 6a) includes a chamfered portion (most easily seen in FIG. 6b, when the stringer is viewed from the opposite end, in which view this part 402R of the stringer is shown on the left). The width of the chamfered portion varies in accordance with the joggling up and down of the foot as the wing panel thickness changes and also varies to accommodate the joggling of the web of the left hand side portion 402L of the stringer. The right-hand part 402R of the stringer is thus similar to one half of the stringer of the second embodiment of the present invention, in that it includes a chamfered portion to accommodate joggles in the shape of the stringer, whilst maintaining a substantially constant developed width, which provides the advantages of reduced defects when manufacturing the multilayer composite stringer. It will be noted that the stringer of the fifth embodiment differs from the stringer of the second embodiment, in that the web of the stringer includes joggles left and right (in the orientation shown in FIGS. 6a and 6b).

FIGS. 7a and 7b simply show opposite ends of a stringer in accordance with the first embodiment and are included for the sake of completeness and to aid comparison between the stringers illustrated by FIGS. 4a to 7b.

Figure 8:
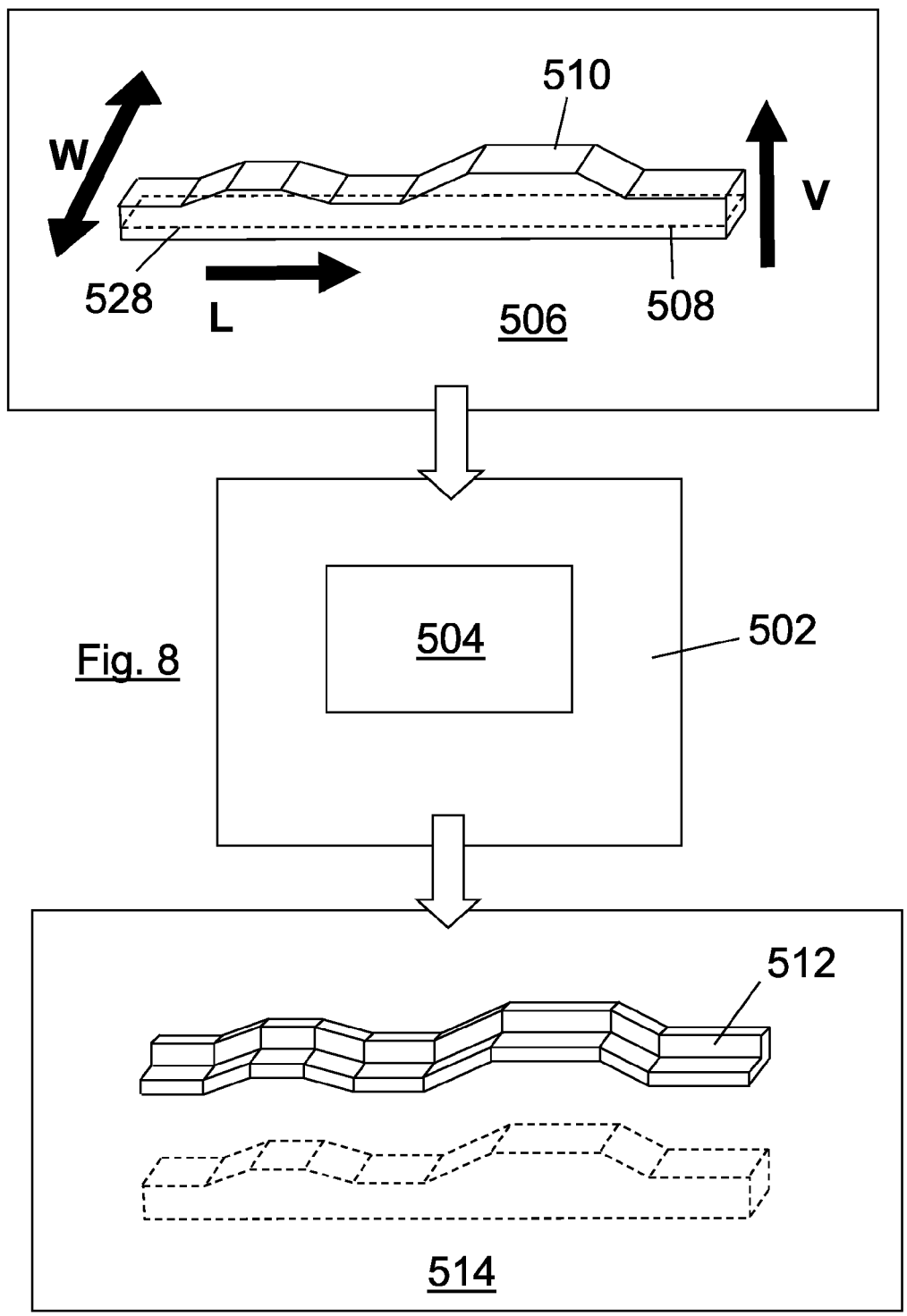
FIG. 8 shows a block diagram illustrating a design method in accordance with a sixth embodiment of the invention.

There will now be described a sixth embodiment relating to method of designing a computer model of a stringer, the computer model subsequently being used to manufacture a stringer from composite material. FIG. 8 shows a block diagram schematically illustrating a computer 502 programmed with software 504 which enables the computer 502 to perform the method according to the sixth embodiment.

There is provided a first data set 506 which defines the geometry of a wing panel model 508. The wing panel model 508 includes data that defines the geometry of the upper surface 510 (as shown in FIG. 8) of the wing panel 508. The stringer model to be created is designed so that its lower surface abuts the upper surface 510 of the wing panel. Thus, the first data set 506 defines the separation of said surface 510 of the wing panel 508 from a reference plane 528. The separation is measured in a direction indicated by the arrow V in FIG. 8. The stringer model to be generated includes a foot which has a geometry corresponding to the surface 510 of the wing panel 508 and a web extending from said foot.

The method of the sixth embodiment includes a step in which the computer 502 receives the first data set 506 as input data. The first data set 506 effectively defines the desired geometry of the foot of the stringer model, providing information concerning the separation of the foot from a datum plane 528, the separation varying along the length of the stringer (the length of the stringer being shown in FIG. 8 by means of the arrow L). The software 504, with which the computer 502 is programmed, includes a module for processing the input data (the first data set 506) to generate output data 514 defining the geometry of a stringer model 512. The computer 502, under the control of the software 504, generates the geometry of the foot of the stringer model and the geometry of the web of the stringer model 512. The geometry of the web of the stringer model 512 is generated by the computer as a function of the local changes in the geometry of the foot of the stringer model. The way in which the geometry of the web of the stringer model is generated may be in accordance with any of the above-described embodiments of the invention or variations thereof. For example, the web may be caused to joggle left and right across the width of the stringer (see double-headed arrow W in FIG. 8). Alternatively or additionally, a chamfer or radius may be introduced in the web (possibly reducing the width of the foot in certain regions) in accordance with the second and third embodiments. Such local changes in the geometry of the web of the stringer model reduce the risk of defects being created in a stringer made from a layered composite material according to the stringer model. Data 514 comprising data representing the geometry of the stringer model 512 is then output from the computer 504.

Thus, in comparison to a nominal standard shape of stringer in which the web simply extends vertically from the edge of the foot, without any joggle, chamfer, radius or other feature that would affect the developed width of a line, which extends from a point on the web across the surface of the stringer to a point on the foot of the stringer when viewed in cross-section, the method effectively generates changes in the geometry of the web of the stringer to offset changes in the geometry of the foot of the stringer. For example, the geometry of the web of the stringer model may be generated in such a way as to reduce any change in the distance as measured along the surface of the stringer model from a first datum line on the foot surface following the length of the stringer to a second datum line on the web surface following the length of the stringer (see for example the notional lines 120 and 122 shown in FIGS. 2c and 2d of the stringer of the second embodiment). Preferably, the web of the stringer model is generated so that there is no change in distance as measured between such a first datum line and such a second datum line (the distance being substantially constant for each cross-section of the stringer model as measured along the length of the stringer). Manipulating and/or designing the stinger model geometry in the manner described above enables a composite stringer to be fabricated with plies (layers) of composite material that are forced to change from a flat geometry to a predefined non-uniform shape but without the bunching or stretching of fibres in the plies of material, which can lead to creases or defects in the stringer thus produced.

Once the stringer model 512 has been generated, computational tests and modelling may be performed to assess the strength and other mechanical characteristics of the stringer model to check that the stringer conforms to various criteria necessary for it to perform its function as a stringer in a wing box or similar structure on a commercial aircraft. The stringer model data 514 may then be used in a method of manufacturing a stringer. The stringer may be manufactured in accordance with standard techniques which are well known in the art. For example, hot drape forming techniques may be used to build-up the layers of the composite material on a mould tool, the tool having a profile in accordance with the geometry of the stringer model 512 previously generated. The layers of composite material once laid up on the mould tool are cured in an autoclave in accordance with known techniques in the art.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The above embodiments concern the shape and geometry of a stringer mounted on a wing panel. It will of course be appreciated that the principles of the above-described embodiments of the invention could be applied to other parts of the structure of an aircraft where there is a panel or portion of skin of the aircraft that is stiffened by means of a stringer. Thus, applications for embodiments of this invention could be widespread within the aerospace sector and include any instance where a composite stringer is required on a varying thickness panel.

The web of the stringer as shown in the Figures has an end surface (the top of the web as shown in the Figures) which lies on a substantially planar surface. The composite stringer may be machined after having been cured so that the top of the stringer web does not follow a substantially straight line. For example, the web may include one or more cut-outs to accommodate other components of the aircraft. Similarly, the foot of the stringer does not need to have an end surface (for example the edge of the stringer to the far right as shown in FIG. 2b) that lies on a substantially flat surface. The foot may for example include one or more cut-outs to accommodate other components of the aircraft or changes in shape in the panel which the stringer abuts.

The stringer is shown in the Figures as extending lengthwise along a substantially straight line. Wing panels and other aerofoil surfaces on aircraft are typically curved and are non-planar. As such it is likely that the stringer will have a shape than extends in one general direction, but which deviates from the straight line geometry of the exemplary stringers illustrated schematically by the accompanying drawings. It will also be appreciated by those skilled in the art that changes in gradient along the surface of the stringer will be gradual as it is difficult for composite materials to have sharp changes in gradient without performing additional machining steps.

The first and second notional reference lines, for example lines 20 and 22, may be in the form of geodesic lines. The geodesic separation between the first and second notional reference lines as measured across the first and third surfaces may be constant for at least part of the length of the stringer (in addition to, or instead of, the distance between the reference lines being constant at successive cross-sections of the stringer as measured within the cross-section.)

It is within the scope of the present invention for sections of the stringer to be in accordance with one or more of the above-mentioned embodiments, and other sections of the stringer not to be in accordance with any of the above embodiments.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:
1. A stringer for use in an aerospace structure, wherein
the stringer is made from composite material comprising a multiplicity of layers,
the stringer has a foot and a web extending from an edge of the foot so that the stringer has a generally L-shaped cross-section along its length,
the stringer defines
a first surface on the foot being shaped to abut a structure to be stiffened, wherein the structure to be stiffened has a varying thickness or height along its length,
a second surface on the foot being opposite the first surface,
a third surface on or in the web being at the same layer in the composite material as the first surface, and
a fourth surface on the web being on the same side of the stringer as the second surface,
the geometry of the stringer varies along at least part of its length so that with increasing distance in a given direction along the length of the stringer, as the thickness or height of the structure to be stiffened varies along its length, the first surface is displaced in a direction towards the second surface as the fourth surface is displaced in a direction towards the third surface, whereby the risk of causing, during fabrication of the stringer, undesirable creasing, stressing or stretching of composite material layers in a region in which the geometry of the stringer varies with increasing distance along its length is reduced.
2. A stringer according to claim 1, wherein
the geometry of the stringer varies along at least part of its length so that with increasing distance in said given direction the second surface moves in the direction from the second surface to the first surface as the third surface moves in the direction from the third surface to the fourth surface.
3. A stringer according to claim 1, wherein
the cross-sectional geometry of the stringer varies along at least part of its length so that the distance between the points at which a cross-section of the stringer intersects with first and second notional reference lines is substantially constant for all such cross-sections of the stringer along said at least part of the length, the distance being measured along the surface of the stringer at the cross-section, each cross-section being taken on a plane that has a normal parallel to the local lengthwise direction of the stringer, the first notional line being positioned on the first surface and being perpendicular to the direction in which the foot extends from the web, the second notional line being positioned on the third surface and being perpendicular to the direction in which the web extends from the foot.
4. A stringer for use in an aerospace structure, wherein
the stringer is made from composite material comprising a multiplicity of layers,
the stringer has a foot and a web extending from the foot,
the stringer defines
a first surface on the foot being shaped to abut a structure to be stiffened,
a second surface on the foot being opposite the first surface,
a third surface on or in the web being at the same layer in the composite material as the first surface, and
a fourth surface on the web being on the same side of the stringer as the second surface,
the cross-sectional geometry of the stringer varies along at least part of its length so that the distance between the points at which a cross-section of the stringer intersects with first and second notional reference lines is substantially constant for all such cross-sections of the stringer along said at least part of the length, the distance being measured along the surface of the stringer at the cross-section, each cross-section being taken on a plane that has a normal parallel to the local lengthwise direction of the stringer, the first notional line being positioned on the first surface and being perpendicular to the direction in which the foot extends from the web, the second notional line being positioned on the third surface and being perpendicular to the direction in which the web extends from the foot, whereby the risk of causing, during fabrication of the stringer, undesirable creasing, stressing or stretching of composite material layers in a region in which the geometry of the stringer varies with increasing distance along its length is reduced.

5. A stringer according to claim 4, wherein the stringer has a cross-sectional shape which is generally T-shaped.

6. A stringer according to claim 4, wherein the stringer has a cross-sectional shape which is generally Y-shaped.

7. A stringer according to claim 4, wherein the stringer has a cross-sectional shape which is generally L-shaped.

8. A stringer according to claim 4, wherein the web of the stringer lies in substantially the same plane along said at least part of the length of the stringer.

9. A stringer according to claim 1, wherein said at least part of the length of the stringer represents the majority of the length of the stringer.

10. A stringer according to claim 1, wherein along said at least part of the length of the stringer the thickness of the foot of the stringer is substantially constant.

11. A stringer according to claim 1, wherein along said at least part of the length of the stringer the thickness of the web of the stringer is substantially constant.

12. An aerospace structure, an outer surface of which being defined by a skin, wherein the skin is stiffened from inside the structure by means of a plurality of stringers mounted on the skin, each of the plurality of stringers being in accordance with a stringer according to claim 1.

13. An aircraft, an outer surface of which being defined by a skin, wherein the skin is stiffened from inside the aircraft by means of a plurality of stringers mounted on the skin, each of the plurality of stringers being in accordance with a stringer according to claim 1.

\* \* \* \* \*